Dec. 20, 1932. T. KAHN 1,891,822
APPARATUS FOR MAKING SOUND RECORDS
Filed Nov. 30, 1929
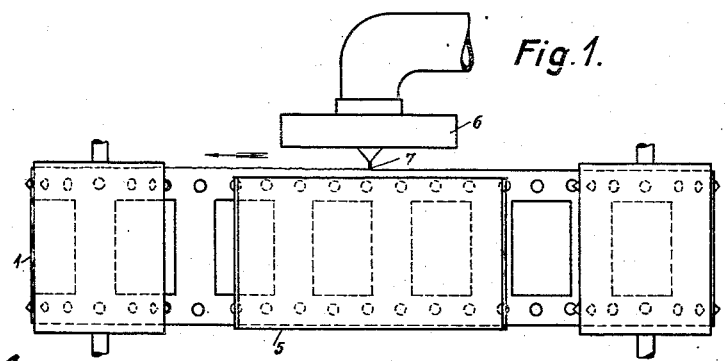
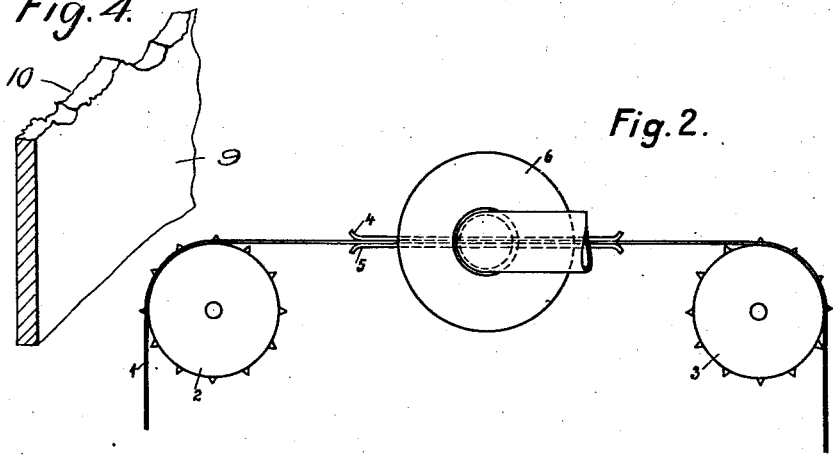
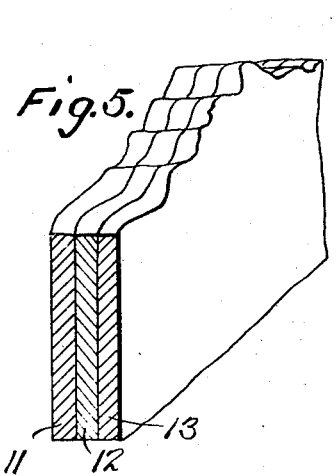
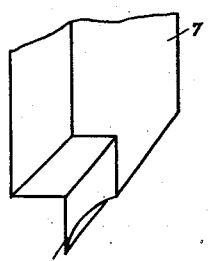

Patented Dec. 20, 1932　　　　　　　　　　　　　　1,891,822

UNITED STATES PATENT OFFICE

THEODOR KAHN, OF BERLIN-CHARLOTTENBURG, GERMANY

APPARATUS FOR MAKING SOUND RECORDS

Application filed November 30, 1929, Serial No. 410,894, and in Germany November 27, 1928.

My invention relates to a machine for making sound records on non-metallic films. More particularly, my invention relates to machines in which the record is obtained by machining the edge of the film.

It is an object of my invention to provide means for machining an exact record. To this end I equip my machine with a single-pointed cutter.

It has already been proposed to cut grooves in phonograph records with a single-pointed tool but the point of this tool is blunted. It has also been proposed to machine metal or other bands with a milling cutter for obtaining thereon a sound record at the edge or edges. Obviously, with a blunted tool or a milling cutter it is impracticable to obtain a perfect record as many details are lost. I have found that it is possible to obtain a really good record only with a single-pointed cutter.

The cost of the records is much reduced by using scrapped picture films which are very cheap, or films without the sensitive layer. The cost may be further reduced by subdividing films of normal width into several narrow strips which are more handy than normal films.

Obviously, I may use as sound records picture films which are still in good condition and thus obtain combined sound and picture films As a burr may form when machining the edge which when it gets into contact with the stylus of the receiving instrument, may cause undesirable noise and indistinct rendering, the cutting edge is preferably made concave that the stylus is not interfered with by the burr.

The cutter is preferably made of very hard material, such as precious stone or special steel so that it will not get blunt and require exchanging.

In the accompanying drawing a machine embodying my invention is illustrated by way of example.

In the drawing
Fig. 1 is an elevation,
Fig. 2 is a plan view of the machine,
Fig. 3 is an enlarged perspective illustration of the cutter,
Fig. 4 is a perspective illustration, drawn to a larger scale and showing the record on the edge of a single film, and
Fig. 5 is a similar illustration showing three films machined together.

Referring now to the drawing, 1 is a film band, 2 and 3 are feed rollers by which the band is moved in the direction of the arrow, Figs. 1, 4 and 5 are parallel guides between which the moving film is held to prevent buckling under the pressure of the cutter, 6 is a sound box, and 7 is the cutter, with its concave cutting edge 8. The concave cutting edge of the cutter makes a convex edge of the film band and keeps the stylus away from any burr which may form.

Referring now to Fig. 4; 9 is a film, and 10 is a record on its edge.

Referring to Fig. 5; 11, 12, and 13 are three films which are placed side by side and machined together.

I claim:

A machine for making sound records comprising a sound box, a cutter adapted to be operated by said sound box, means for feeding a film past said cutter in a straight line, with its edge presented to said cutter, and a curved cutting edge on said cutter with its concave side turned toward the edge of said film.

In testimony whereof I affix my signature.

THEODOR KAHN.